(12) United States Patent
Percec et al.

(10) Patent No.: US 9,056,954 B2
(45) Date of Patent: Jun. 16, 2015

(54) CATHODIC ELECTROCOATING COMPOSITIONS

(75) Inventors: Simona Percec, Philadephia, PA (US); Susan H. Tilford, Ewing, NJ (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 684 days.

(21) Appl. No.: 13/316,676

(22) Filed: Dec. 12, 2011

(65) Prior Publication Data

US 2013/0146466 A1    Jun. 13, 2013

(51) Int. Cl.
| | | |
|---|---|---|
| *C09D 177/00* | (2006.01) | |
| *C08L 77/00* | (2006.01) | |
| *C25D 5/02* | (2006.01) | |
| *C08F 236/20* | (2006.01) | |
| *C08J 3/07* | (2006.01) | |
| *C08L 23/08* | (2006.01) | |
| *C08J 3/24* | (2006.01) | |
| *C08K 5/378* | (2006.01) | |

(52) U.S. Cl.
CPC . *C08J 3/07* (2013.01); *C08K 5/378* (2013.01); *C08L 23/08* (2013.01); *C08J 3/24* (2013.01); *C08J 2323/08* (2013.01)

(58) Field of Classification Search
CPC ........ C09D 117/00; C08L 77/00; C25D 5/02; C08F 236/20
USPC .................. 524/555; 205/50, 134; 525/328.3
See application file for complete search history.

(56) References Cited

U.S. PATENT DOCUMENTS

| | | | | |
|---|---|---|---|---|
| 3,157,595 | A | * 11/1964 | Johnson et al. | ................ 210/734 |
| 4,412,043 | A | * 10/1983 | Pazos | .......................... 525/328.2 |
| 5,498,785 | A | * 3/1996 | Wang et al. | .................... 525/371 |

OTHER PUBLICATIONS

Xu et al., "A Strategy to introduce the pH sensitivity to temperature sensitive PNIPAAm hydrogels without weakening the thermosensitivity", Carbohydrate Polymers, 68 (2007) 416-424.*

* cited by examiner

*Primary Examiner* — Ling Choi
*Assistant Examiner* — Ronald Grinsted
(74) *Attorney, Agent, or Firm* — Ingrassia Fisher & Lorenz, P.C.

(57) ABSTRACT

Disclosed herein are functionalized polymers comprising ethylene and substituted ethylene segments, which have been crosslinked using a multifunctional thiol to enhance their crosslinking ability. These functionalized polymers are useful as film forming resins in cathodic electrocoating compositions. Also disclosed herein are aqueous dispersion compositions comprising the functionalized polymers and a process for coating various electrically conductive substrates.

21 Claims, No Drawings

CATHODIC ELECTROCOATING COMPOSITIONS

FIELD OF THE INVENTION

The invention relates to the field of electrocoating compositions. More specifically, the invention relates to cathodic electrocoating compositions containing functionalized polymers comprising ethylene and substituted ethylene segments that have been crosslinked with multifunctional thiols.

BACKGROUND

The coating of electrically conductive substrates by an electrodeposition process, also called an electrocoating process, is a well-known and important industrial process. For example, electrodeposition of primers on metal automotive substrates is widely used in the automotive industry. In this process, a conductive article, such as an autobody or an auto part, is immersed in a bath of an aqueous emulsion of film forming polymer and the article acts as an electrode in the electrodeposition process. An electric current is passed between the article and a counter-electrode in electrical contact with the coating composition until a coating is deposited on the article. In a cathodic electrocoating process, the article to be coated is the cathode and the counter-electrode is the anode.

Film forming resin compositions used in the bath of a typical cathodic electrodeposition process also are well known in the art and have been in use since the 1970's. These resins typically are made from polyepoxide resins that have been chain extended with an amine compound(s). The epoxy amine adduct is then neutralized with an acid compound to form a water soluble or water dispersible resin. These resins are blended with a crosslinking agent, usually a polyisocyanate, and dispersed in water to form a water emulsion.

Currently, cathodic electrodeposition is the preferred method used by the automotive industry. However, there is still a need for improved electrocoating compositions that require lower baking temperatures, and result in coatings having improved UV stability and improved resistance to chipping.

SUMMARY

In one aspect the invention is a composition comprising the reaction product formed by combining:
a) a polymer comprising:
  i) at least one ethylene segment of structure 1

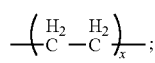

Structure 1 ii) at least one substituted ethylene segment of structure 2

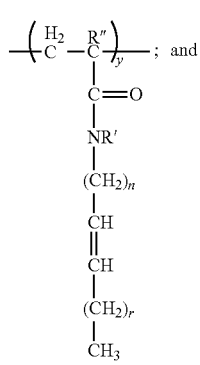; and

Structure 2 iii) at least one substituted ethylene segment of structure 3

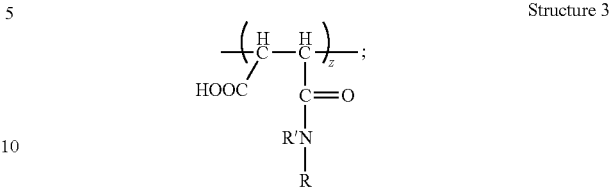

Structure 3 wherein:
x and y are independently integers from 10 to 30,000, and z is an integer from 1 to 10;
R is independently at least one member selected from the group consisting of: $-(CH_2)_m N(CH_3)_2$, $-(CH_2)_n-(CH=CH)-(CH_2)_v CH_3$, $-(CH_2)_v CH_3$, $-(CH_2)_p OH$, $-(CH_2)_s N(CH_2CH_2OH)_2$, and $-(CH_2)_t OPO_3H_2$;
R' in structure 2 and R' in structure 3 are independently H, $-C_q H_{2q+1}$, or $-C_q H_{2q-k}$;
R" is H or $CH_3$; and
where q, r, s, t, m, n, v, and p are independently selected from the group of integers from 1 to 20, and k is the number of saturated hydrocarbon rings in $-C_q H_{2q-k}$;
with
  b) a multifunctional thiol containing two or more thiol end groups.

In another aspect, the invention is an aqueous dispersion composition comprising:
  a) a functionalized polymer as disclosed herein; and
  b) water;
wherein the aqueous dispersion composition has a pH of 5.0 to 7.0.

In another aspect, the invention is a process comprising the steps of:
  a) providing an electrochemical cell comprising:
    i) an aqueous dispersion composition as disclosed herein;
    ii) a substrate to be coated, wherein the substrate is in contact with the aqueous dispersion composition and the substrate serves as a cathode of the electrochemical cell;
    iii) an anode in contact with the aqueous dispersion composition; and
    iv) a power supply in electrical contact with the anode and cathode; and
  b) applying a voltage between the cathode and the anode to electrodeposit a polymer coating onto at least a portion of the substrate that is in contact with the aqueous dispersion.

In another aspect, the invention is a coated article produced by the process disclosed herein.

DETAILED DESCRIPTION

Disclosed herein are novel functionalized polymers, which are useful as film forming resins in cathodic electrocoating compositions. The functionalized polymers comprise ethylene and substituted ethylene segments, which have been crosslinked with a multifunctional thiol to enhance their crosslinking ability. The enhanced crosslinking ability would be expected to improve adhesion of the functionalized polymers to metal surfaces. Also disclosed herein are aqueous dispersion compositions comprising the functionalized polymers and a process for coating various electrically conductive substrates. The functionalized polymer coating on the substrate provides enhanced corrosion protection.

Polymer Compositions

The functionalized polymers disclosed herein comprise the reaction product formed by combining:
a) a polymer comprising:
i) at least one ethylene segment of structure 1

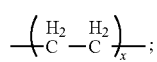

Structure 1 ii) at least one substituted ethylene segment of structure 2

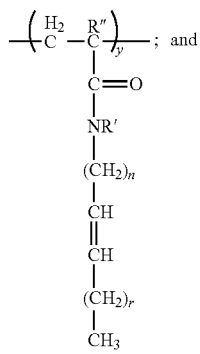

Structure 2 iii) at least one substituted ethylene segment of structure 3

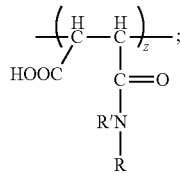

Structure 3 wherein: x and y are independently integers from 10 to 30,000, and z is an integer from 1 to 10; R' in structure 2 and R' in structure 3 are independently H, $-C_qH_{2q+1}$, or $-C_qH_{2q-k}$; R" is H or $CH_3$; R is independently at least one member selected from the group consisting of: $-(CH_2)_mN(CH_3)_2$, $-(CH_2)_n-(CH=CH)-(CH_2)_rCH_3$, $-(CH_2)_vCH_3$, $-(CH_2)_pOH$, $-(CH_2)_sN(CH_2CH_2OH)_2$, and $-(CH_2)_tOPO_3H_2$;
where q, r, s, t, m, n, v, and p are independently selected from the group of integers from 1 to 20, and k is the number of saturated hydrocarbon rings in $-C_qH_{2q-k}$;
with
b) a multifunctional thiol containing two or more thiol end groups.

In one embodiment, R' in structure 2 and R' in structure 3 are H, and R is $-(CH_2)_n-(CH=CH)-(CH_2)_rCH_3$.

In another embodiment, R' in structure 2 and R' in structure 3 are H, and R is $-(CH_2)_n-(CH=CH)-(CH_2)_rCH_3$, and n=8, r=7

In another embodiment, R' in structure 2 and R' in structure 3 are H, and R is $-(CH_2)_n-(CH=CH)-(CH_2)_rCH_3$ and $-(CH_2)_pOH$.

In another embodiment, R' in structure 2 and R' in structure 3 are H, R is $-(CH_2)_n-(CH=CH)-(CH_2)_rCH_3$ and $-(CH_2)_pOH$, and n=8, r=7, and p=2.

The functionalized polymers disclosed herein may be prepared by chemical modification of random or block copolymers comprising ethylene, and substituted ethylene segments (i.e., acrylate alkyl ester, and maleic anhydride segments). Specifically, these random and block copolymers comprise:
i) at least one ethylene segment of structure A;

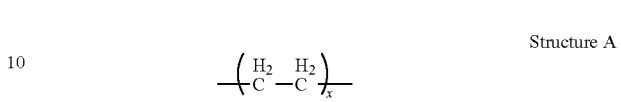

Structure A ii) at least one substituted ethylene segment of structure B;

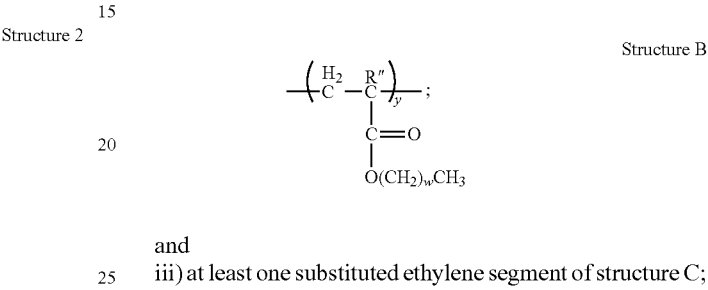

Structure B and
iii) at least one substituted ethylene segment of structure C;

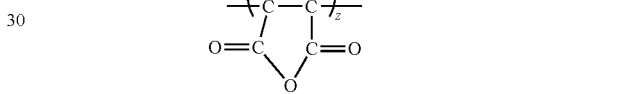

Structure C wherein: x and y are independently integers from 10 to 30,000, z is an integer from 1 to 10, w is an integer from 0 to 3, and R" is H or $CH_3$.

In some embodiments, the copolymer comprises about 15 to 59.5 wt % (percent by weight) of structure A, about 40 to 75 wt % of structure B, and about 0.5 to 10 wt % of structure C. In other embodiments, the copolymer comprises about 25 to 49.5 wt % of structure A, about 50 to 70 wt % of structure B, and about 0.5 to 5 wt % of structure C.

Suitable copolymers comprising these segments may be prepared using methods known in the art. For example, the copolymers may be prepared by free radical-initiated emulsion polymerization, or bulk or solution polymerization in the presence of organic hydroperoxides, peroxides, diazo compounds, or the like (see for example, Greene, U.S. Pat. No. 3,904,588; and Wu et al., U.S. Pat. No. 7,608,675). As an alternative to preparing the starting copolymer, Vamac® ethylene acrylic elastomers, sold by E. I. du Pont de Nemours and Co. (Wilmington, Del.), can be used.

The starting copolymers are first aminated by reaction with a primary or secondary amine-containing compound which contains a carbon-carbon double bond. Suitable amine-containing compounds include, but are not limited to, compounds of the general formula $R'NH(CH_2)_n-(CH=CH)-(CH_2)_rCH_3$ where R' is H, $-C_qH_{2q+1}$ (alkyl) or $-C_qH_{2q-k}$ (cycloalkyl), and n, r, and q are independently selected from the group of integers from 1 to 20, and k is the number of saturated hydrocarbon rings in $-C_qH_{2q-k}$. Other additional primary or secondary amine-containing compounds may be used in combination with the amine-containing compound containing the carbon-carbon double bond. Suitable additional primary or secondary amine containing-compounds include $R'NH(CH_2)_mN(CH_3)_2$, $R'NH(CH_2)_vCH_3$, R'NH $(CH_2)_pOH$, $R'NH(CH_2)_sN(CH_2CH_2OH)_2$, and $R'NH(CH_2)_tOPO_3H_2$, where R' is H, $-C_qH_{2q+1}$ (alkyl) or $-C_qH_{2q-k}$ (cycloalkyl), and q, s, t, m, v, and p are independently selected from the group of integers from 1 to 20 and k is the number of saturated hydrocarbon rings in $-C_qH_{2q-k}$. Combinations of two or more of these additional amine-containing compounds may be used.

In one embodiment, oleylamine, is used to aminate the starting copolymer.

In another embodiment, a combination of oleylamine and ethanolamine is used to aminate the starting copolymer.

The aminated copolymer can be prepared by combining the starting copolymer with at least one amine-containing compound and a suitable catalyst in a solvent, such as methyl isobutyl ketone, diisobutyl ketone, methyl ethyl ketone, toluene, xylene, trichloroethylene, dichlorobenzene, and mixtures thereof. Suitable catalysts include, but are not limited to, diazabicylco[2.2.2]octane, tertiary amines, hindered secondary amines, and bifunctional derivatives such as imidazoles and 8-hydroxyquinoline. The resulting mixture is stirred for a time sufficient to obtain the desired degree of functionalization. The reaction mixture may be heated to increase the rate of reaction. The mixture may be further heated to remove volatile components and the resulting aminated copolymer may be recovered using methods known in the art, such as precipitation. The degree of functionalization of the product can be determined using methods known in the art, such as infrared (IR) spectrometry, proton nuclear magnetic resonance ($^1$H NMR) spectroscopy, and carbon nuclear magnetic resonance ($^{13}$C NMR) spectroscopy. In one embodiment, the degree of functionalization is at least 10 mol %.

The aminated copolymer may also be prepared using a batch kneading process. In this embodiment, the reaction is conveniently carried out in a kneader/reactor. Suitable kneader/reactors are known in the art and are available from companies such as LIST AG (Arisdorf, Switzerland). Kneader/reactors are specifically designed to handle highly viscous, sticky, and pasty materials as they provide intensive mixing and kneading action, referred to herein as "agitation". Kneader/reactors typically are made of stainless steel, are jacketed for temperature control, and have ports for introducing polymer and other reactants, application of vacuum, and introducing purge gases. Agitation in the kneader/reactor is typically accomplished by means of impellers and hooks/baffles which are attached to the walls of the kneader/reactor.

The starting copolymer comprising structures A, B, and C, as defined above, is provided as a solid, for example in a kneader/reactor, and then is heated to a temperature sufficient to soften the polymer. The temperature needed is dependent on the particular polymer used and is readily determined by one skilled in the art using routine experimentation. Typically for the copolymers disclosed herein, the temperature is in the range of about 70° C. to about 100° C. Then, at least one amine-containing compound, as described above, is added to the softened polymer to form a mixture. In this embodiment, the use of a catalyst is optional; a catalyst is not required. If a catalyst is used, one may be chosen from those listed above. The mixture is agitated and heated for a combination of time and temperature sufficient to form the aminated copolymer. Typically, the mixture is agitated and heated at a temperature of about 100° C. to about 270° C., more particularly, about 100° C. to about 125° C. Generally, shorter reaction times are used at higher temperatures, as is known in the art. In one embodiment, the mixture is heated to a temperature of about 100° C. to about 125° C. for 4 to 6 hours. Then, the resulting aminated copolymer is recovered, e.g., removed from the kneader/reactor by opening a bottom drain valve and applying pressure with an inert gas, such as nitrogen, above the polymer so that it will flow out of the kneader/reactor. For large scale production, the aminated copolymer may be prepared in a continuous process using a continuous kneader or extruder.

The functionalized polymer disclosed herein, also referred to herein as the thiol-crosslinked, aminated polymer, is prepared by reacting the aminated copolymer with a multifunctional thiol, optionally in the presence of a conventional radical initiator. The term "multifunctional thiol" as used herein, refers to an organic compound containing two or more thiol end groups. Suitable multifunctional thiols include, but are not limited to, pentaerythritol tetra-(3-mercaptopropionate), ethoxylated pentaerythritol tetra-(3-mercaptopropionate), trimethylpropane tri(3-mercapto-propionate), glycol 3-mercaptopropionate, poly propylene glycol 3-mercaptopropionate, ethoxylated trimethylpropane tri(3-mercapto-propionate), ethoxylated glycol dimercaptoacetate, trimethylolpropane trimercaptoacetate, glycol di-(3-mercaptopropionate), 1,4-bis(3-mercaptobutylyloxy) butane, pentaerithrytol tetrakis(3-mercaptobutylate), tris[2-(3-mercaptopropionyloxy)ethyl]isocyanurate, 1,3,5-Tris(3-melcaptobutyloxethyl)-1,3,5-triazine-2,4,6(1H,3H,5H)-trione, and mixtures thereof. In one embodiment, the multifunctional thiol is tris[2-(3-mercaptopropionyloxy)ethyl]isocyanurate. The optional radical initiator may be chosen from initiators known in the art, such as peroxydisulfate or photoinitiators such as 2-hydroxy-1-[4(hydroxyethoxy)phenyl]-2-methyl-1 propanone (trade name Irgacure® 2959 photoinitiator, BASF Corp., Worcester, Mass.).

To form the functionalized polymer disclosed herein, the aminated copolymer may be dissolved in a suitable solvent, such as methyl isobutyl ketone, diisobutyl ketone, methyl ethyl ketone, toluene, xylene, trichloroethylene, dichlorobenzene, and mixtures thereof. Heat may be applied to facilitate the dissolution of the copolymer. Then, the multifunctional thiol is added. The mixture may be kept and room temperature or heated to a temperature up to about 100° C. Optionally, an isocyanate agent such as (trimethoxysilyl)propyl isocyanate may be added and heating is continued for a time sufficient to dissolve the isocyanate. The isocyanate attaches to the polymer backbone by reaction with hydroxyl or acid groups and improves adhesion of the final film to metal substrates. Heating is continued for a time sufficient to form the functionalized polymer. Alternatively, the reaction may be carried out in a kneader reactor, as described above Aqueous Dispersion Composition An aqueous dispersion of the functionalized polymer disclosed herein can be prepared by adding the functionalized polymer to water and adjusting the pH to about 5.0 to 7.0, more particularly, about 6.0 to 7.0, and more particularly, about 6.5 to 7.0, with the addition of an acid. Suitable acids include, but are not limited to, acetic acid, sulfonic acid, formic acid, phosphoric acid, and fatty acids, such as lauryl acid. The term "aqueous dispersion", as used herein, refers to a two-phase system in which solid particles are dispersed in an aqueous solution. The dispersing agent for the disclosed functionalized polymers is water; however, small amounts of volatile organic solvents may be present. Typically, the aqueous dispersion comprises about 5% to about 50% by weight of the functionalized polymer. The resulting mixture is stirred using methods and apparatus known in the art, such as stirred tanks, stirred mills, static mixers, and the like. The mixture may be heated to aid in the formation of the dispersion.

The aqueous dispersion can also be prepared using a phase inversion process, wherein the functionalized polymer is first dissolved in an organic solvent, such as methyl isobutyl ketone. The resulting solution is then poured into an acidified aqueous solution having a pH of about 5.0 to 7.0, more particularly, about 6.0 to 7.0, and more particularly, about 6.5 to 7.0, with high speed mixing. The solvent is removed using methods known in the art, such as evaporation, to yield the aqueous dispersion.

The aqueous dispersion may further comprise at least one crosslinking agent. Suitable crosslinking agents are known in the art, and include, but are not limited to, blocked isocyanates, melamine-formaldehyde resins, tris(alkoxycarbonylamino)triazines, alkoxysilanes, and polyepoxides. In some embodiments, a blocked isocyanate crosslinking agent is used. Isocyanate crosslinking agents and blocking agents are well known in the art (see for example Wismer et al., U.S. Pat. No. 4,419,467). Suitable isocyanate crosslinking agents include, but are not limited to, aliphatic, cycloaliphatic and aromatic isocyanates such as hexamethylene diisocyanate, cyclohexylene diisocyanate, tolylene-2,4-diisocyanate, 4,4'-methylene diphenyl diisocyanate, and the like. These isocyanates are pre-reacted with a blocking agent such as oximes, alcohols, or caprolactams which block the isocyanate functionality, i.e., the crosslinking functionality. Upon heating the blocking agents dissociate, thereby providing a reactive isocyanate group and crosslinking occurs. In some embodiments, the blocked isocyanate crosslinking agent is an alcohol blocked, methylene diphenyl diisocyanate, as described by Gam (U.S. Pat. No. 6,207,731). In some embodiments, the crosslinking agent is an alkoxysilane, such as 3-(isocyanatopropyl)triethoxysilane. The aqueous dispersion generally contains about 10% to about 50%, more particularly, about 30% to about 40% by weight of the functionalized polymer and the crosslinking agent. The aqueous dispersion may be further diluted with water when added to an electrocoating bath to give a range of about 10% to about 30% by weight of the functionalized polymer and the crosslinking agent.

The aqueous dispersion may further comprise other optional additives, if desirable. Optional additives can include, for example, surfactants, pigments, light stabilizers, anti-crater agents, flow aids, dispersion stabilizers, adhesion promoters, corrosion inhibitors, and fillers.

Examples of surfactants include alkoxylated styrenated phenols, such as, for example, SYNFAC® 8334, available from Milliken Chemical Company, Spartanburg, S.C.; alkyl imidazoline surfactants; and nonionic surfactants such as, for example, SURFYNOL® surfactants, available from Air Products, Allentown, Pa. Combinations of surfactants can also be used.

The aqueous dispersion may also comprise at least one pigment. Pigments for use herein may be selected from color pigments, effect pigments, electrically conductive pigments, magnetically shielding pigments, extender pigments, and anti-corrosion pigments. Examples of useful pigments include, but are not limited to, titanium dioxide, ferric oxide, red iron oxide, transparent red iron oxide, black iron oxide, brown iron oxide, chromium oxide green, carbon black, aluminum silicate, precipitated barium sulfate and combinations thereof.

Light stabilizers, such as, for example, hindered amine light stabilizers can be added to the aqueous dispersion composition. Representative commercially available hindered amine light stabilizers can be, for example, TINUVIN® 770, 292 and 440 which are sold by Ciba Specialty Chemicals Corporation.

The aqueous dispersion composition may also comprise at least one anti-crater agent. Anti-crater agents are well known in the art; examples are given by Chung (U.S. Pat. No. 5,789,468), Gam (U.S. Pat. Nos. 5,908,910, and 6,207,731), and Gam et al. (U.S. Pat. No. 7,264,706).

Flow aids include materials such as, for example, ethylene and/or propylene adducts of nonyl phenols or bisphenols.

Process for Coating a Substrate

The aqueous dispersion disclosed herein can be used in a conventional cathodic electrocoating process to coat a substrate. Accordingly, in one embodiment, the invention provides a process for coating a substrate comprising the steps of:

(a) providing an electrochemical cell comprising:
 (i) an aqueous dispersion as described above;
 (ii) a substrate to be coated, wherein the substrate is in contact with the aqueous dispersion and the substrate serves as a cathode of the electrochemical cell;
 (iii) an anode in contact with the aqueous dispersion; and
 (iv) a power supply in electrical contact with the anode and cathode; and
(b) applying a voltage between the cathode and the anode to electrodeposit a polymer coating onto at least a portion of the substrate that is in contact with the aqueous dispersion.

In one embodiment, the substrate is partially immersed in the aqueous dispersion. In another embodiment, the entire substrate is immersed in the aqueous dispersion.

Useful substrates that can be coated using the process disclosed herein are electrically conductive substrates including, but not limited to, metallic materials, for example ferrous metals such as iron, steel, and alloys thereof, non-ferrous metals such as aluminum, zinc, magnesium and alloys thereof, and combinations thereof. In some embodiments, the substrate is cold-rolled steel, zinc-coated steel, aluminum or magnesium.

The voltages that are applied in the process vary depending on the type of coating and on the coating thickness desired and may be as low as 1 volt or as high as several thousand volts. Typical voltages used are between 50 to 500 volts. The current density can vary in the range from 1 ampere per square meter to 150 amperes per square meter. The process is typically carried out at a temperature between 25° C. to about 40° C. The time required for the process will vary depending on the desired thickness of the polymer coating.

After the polymer coating has been deposited onto the substrate, the resulting coated substrate is removed from the aqueous dispersion. The coated substrate can optionally be rinsed and then the polymer coating is cured by baking at elevated temperature, such as 150 to 250° C., for a time sufficient to cure the coating. Heating may be done using any means known in the art, such as heating in a baking oven, with a bank of infrared lamps, or a combination thereof.

The thickness of the dried and cured polymer coating is typically between 12 to 50 microns, more particularly, between 15 to 45 microns.

The substrate that is coated with the dried and cured polymer coating can be used as is or additional layers of coating compositions can be applied thereon. In the manufacture of automobiles and other consumer goods, the cured polymer coating can be further coated with one or more of commercially available primers, primer surfacers, sealers, basecoat compositions, clearcoat compositions, glossy topcoat compositions and any combination thereof.

The coated substrates can be various articles used as components to fabricate automotive vehicles, automobile bodies, any and all items manufactured and painted, such as, for example, frame rails, commercial trucks and truck bodies, including but not limited to beverage truck bodies, utility truck bodies, ready mix concrete delivery vehicle bodies, waste hauling vehicle bodies, and fire and emergency vehicle bodies, as well as any potential attachments or components to such truck bodies, buses, farm and construction equipment, truck caps and covers, commercial trailers, consumer trailers, recreational vehicles, including but not limited to, motor homes, campers, conversion vans, vans, pleasure vehicles, pleasure craft, snow mobiles, all terrain vehicles, personal watercraft, motorcycles, boats, and aircraft. The substrate further includes industrial and commercial new construction components; walls of commercial and residential structures, such as office buildings and homes; amusement park equipment; marine surfaces; outdoor structures, such as bridges, towers; coil coating; railroad cars; machinery; OEM tools; signage; sporting goods; and sporting equipment. The substrates can have any shape, for example, in the form of automotive body components, such as bodies (frames), hoods, doors, fenders, bumpers and/or trim, for automotive vehicles.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

The meaning of abbreviations used is as follows: "min" means minute(s), "hr" means hour(s), "sec" means second(s), "L" means liter(s), "mL" means milliliter(s), "μL" means microliter(s), "g" means gram(s), "mg" means milligram(s), "μg" means microgram(s), "mol" means mole(s), "mmol" means millimole(s), "cm" means centimeter(s), "mm" means millimeter(s), "μm" means micrometer(s), "mils" means thousandths of an inch, "M" means molar concentration, "wt %" means percent by weight, "V" means volt(s), "rpm" means revolutions per minute.

Reagents

Vamac® MR ethylene acrylic elastomer was obtained from E. I. du Pont de Nemours and Co. (Wilmington, Del.). All other reagents were obtained from Sigma-Aldrich (St Louis, Mo.) unless otherwise noted.

Example 1

Thiol Crosslinking of Polyethylene-Methyl Acrylate-Maleic Anhydride) (Vamac® MR) Functionalized with Oleylamine and Ethanolamine Vamac® MR ethylene acrylic elastomer was first aminated with oleylamine and ethanolamine according to the following procedure. Vamac® MR ethylene acrylic elastomer (200 g) and methyl isobutyl ketone (MIBK) (874 mL) were placed into a 1 L round-bottomed glass flask equipped with stirring and fitted with a Dean-Stark trap, condenser, and addition funnel. The flask was placed into an oil bath heated to 90-100° C. and stirred at 600 rpm to dissolve the polymer. Then, 1,4-diazabicyclo[2.2.2]octane (DABCO) catalyst (1.53 mol, 172 g) was added, followed by the addition of ethanolamine (0.767 mol, 46.8 g) and oleylamine (0.767 mol, 205 g). The amines were added rapidly over a 1-2 min period at about 60° C. internal temperature. The flask was heated for 24 hr at 135° C. The solution was cooled and then the product was precipitated in acetonitrile in a blender in 100-150 g portions. The product was dried under vacuum at room temperature. The resulting material was dissolved in tetrahydrofuran, precipitated in water in a blender in 70-100 g portions, and dried under vacuum to give the aminated Vamac® MR polymer Formation of the aminated Vamac® MR polymer was verified using $^{13}C$ and $^{1}H$ NMR, and IR spectroscopic methods. For the IR analysis, the decrease in intensity of the C=O peak at 1738 $cm^{-1}$ and the appearance of amide peaks at 3300 and 1660 $cm^{-1}$ were used to confirm the formation of the aminated polymer.

The resulting aminated Vamac® MR polymer was reacted with tris[2-(3-mercaptopropionyloxy)ethyl]isocyanurate using the following procedure. The aminated Vamac® MR polymer (39.7 g) was dissolved in 90 g of MIBK in a 250-mL storage bottle by gentle warming to about 70° C. Next, 0.501 g of 3-(trimethoxysilyl)propyl isocyanate was added and heating was continued for 30 min. After this time, 5.0 g of tris[2-(3-mercaptopropionyloxy)ethyl]isocyanurate (diluted with 5 g of MIBK) was added to the solution and heating was continued for 15 min to yield the thiol-crosslinked, aminated Vamac® MR polymer.

Example 2

Aqueous Dispersion of Thiol-Crosslinked, Aminated Vamac® MR Polymer

An aqueous dispersion of the thiol-crosslinked, aminated Vamac® MR polymer was obtained by phase inversion of the MIBK solution produced as described in Example 1 according to the following procedure. Deionized water (200 g) and 0.66 g of acetic acid were added to a stainless steel container and stirred at approximately 1800 rpm using an overhead stirrer (IKA-WERKE Eurostar power control-visc) with a high speed disperser (HSD) blade. The solution of thiol-crosslinked, aminated Vamac® MR polymer from Example 1 was slowly poured into the dilute acid solution with continued stirring over a period of 10 min. Stirring was continued for an additional 10 min and then the dispersion was transferred to a 1000-mL round bottom flask and the MIBK was removed by rotary evaporation. The dispersion was returned to the steel container and stirred at about 400 rpm overnight. The total dispersion (190 g, 17% solids) was transferred to a tared 500-mL storage bottle. The dispersion was filtered through a 2.7 μm nylon filter to yield an aqueous dispersion of the functionalized Vamac® MR polymer.

Example 3

Cathodic Electrodeposition of the Aqueous Dispersion of Thiol-Crosslinked, Aminated Vamac® MR Polymer Cathodic electrodeposition of the aqueous dispersion of thiol-crosslinked, aminated Vamac® MR polymer obtained as described in Example 2 was performed using the following procedure.

Cathodic electrodeposition of the functionalized Vamac® MR polymer was carried out using 3 inch×5 inch (7.6 cm×12.7 cm) zinc phosphated coated steel plates as the cathode, a stainless steel plate as the anode, and the aqueous dispersion described in Example 2 as the electrolyte medium. The ratio of the area of the cathode to the area of the anode was 3:1, and the cathode-to-anode distance was 3 inches (7.6 cm). The temperature of the electrocoating bath was 32° C. A 23 mm Teflon®-coated paddle, centrally located in the one liter cylindrical coating container, was used to stir the dispersion. The amperage was set at a maximum value of 0.5 amps, but the actual value attained was less than the set value. The voltage was increased from 0 to 180 V over a period of 15 sec (the "ramp time"). The "dwell time," or period of constant voltage, was 120 sec. The polymer-coated, zinc phosphated coated steel plates were removed from the bath, rinsed with water, and air-dried and baked in an oven at 205° C. for 30 min. A continuous coating of thiol-crosslinked, aminated Vamac® MR polymer was formed on the plate.

The invention claimed is:

1. A composition comprising the reaction product formed by combining:
  a) a polymer comprising:
    i) at least one ethylene segment of structure 1

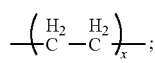
    Structure 1 ii) at least one substituted ethylene segment of structure 2

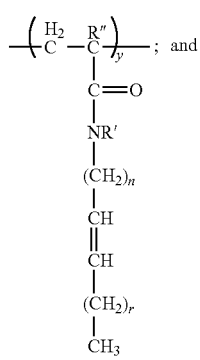
    Structure 2 iii) at least one substituted ethylene segment of structure 3

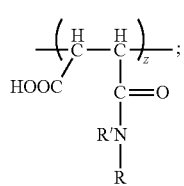
    Structure 3 wherein:
  x and y are independently integers from 10 to 30,000, and z is an integer from 1 to 10;
  R is independently at least one member selected from the group consisting of: $-(CH_2)_m N(CH_3)_2$, $-(CH_2)_n-(CH=CH)-(CH_2)_r CH_3$, $-(CH_2)_v CH_3$, $-(CH_2)_p OH$, $-(CH_2)_s N(CH_2CH_2OH)_2$, and $-(CH_2)_t OPO_3H_2$;
  R' in structure 2 and R' in structure 3 are independently H, $-C_q H_{2q+1}$, or $-C_q H_{2q-k}$;
  R" is H or $CH_3$; and
  where q, r, s, t, m, n, v, and p are independently selected from the group of integers from 1 to 20, and k is the number of saturated hydrocarbon rings in $-C_q H_{2q-k}$;
  with
  b) a multifunctional thiol containing two or more thiol end groups.

2. The composition of claim 1, wherein R' in structure 2 and R' in structure 3 are H, and R is $-(CH_2)_n-(CH=CH)-(CH_2)_r CH_3$.

3. The composition of claim 2, wherein n=8 and r=7.

4. The composition of claim 1, wherein R' in structure 2 and R' in structure 3 are H, and R is $-(CH_2)_n-(CH=CH)-(CH_2)_r CH_3$ and $-(CH_2)_p OH$.

5. The composition of claim 4, wherein n=8, r=7, and p=2.

6. The composition of claim 1, wherein the multifunctional thiol is selected from the group consisting of: pentaerythritol tetra-(3-mercaptopropionate), ethoxylated pentaerythritol tetra-(3-mercaptopropionate), trimethylpropane tri(3-mercapto-propionate), glycol 3-mercaptopropionate, poly propylene glycol 3-mercaptopropionate, ethoxylated trimethylpropane tri(3-mercapto-propionate), ethoxylated glycol dimercaptoacetate, trimethylolpropane trimercaptoacetate, glycol di-(3-mercaptopropionate), 1,4-bis(3-mercaptobutyloxy) butane, pentaerithrytol tetrakis(3-mercaptobutylate), tris[2-(3-mercaptopropionyloxy)ethyl]isocyanurate, 1,3,5-Tris(3-melcaptobutyloxethyl)-1,3,5-triazine-2,4,6(1H,3H,5H)-trione, and mixtures thereof.

7. The composition of claim 6, wherein the multifunctional thiol is tris[2-(3-mercaptopropionyloxy)ethyl]isocyanurate.

8. The composition of claim 1, wherein the radical intiator is selected from the group consisting of peroxides and diazo compounds.

9. The composition of claim 1 wherein the combining of (a) and (b) is done in the presence of a radical initiator.

10. An aqueous dispersion composition comprising:
  a) a composition of claim 1; and
  b) water;
  wherein said aqueous dispersion composition has a pH of 5.0 to 7.0.

11. The aqueous dispersion composition of claim 10 further comprising at least one crosslinking agent.

12. The aqueous dispersion composition of claim 11, wherein the at least one crosslinking agent is a blocked isocyanate.

13. The aqueous dispersion composition of claim 11, wherein the at least one crosslinking agent is an alkoxysilane.

14. The aqueous dispersion composition of claim 10 further comprising at least one additive selected from the group consisting of: surfactants, pigments, light stabilizers, anti-crater agents, flow aids, dispersion stabilizers, adhesion promoters, corrosion inhibitors, and fillers.

15. The aqueous dispersion composition of claim 10 having a pH of 6.0 to 7.0.

16. The aqueous dispersion composition of claim 10 having a pH of 6.5 to 7.0.

17. A process comprising the steps of:
  a) providing an electrochemical cell comprising:
    i) an aqueous dispersion composition of claim 8;
    ii) a substrate to be coated, wherein the substrate is in contact with the aqueous dispersion composition and the substrate serves as a cathode of the electrochemical cell;
    iii) an anode in contact with the aqueous dispersion composition; and
    iv) a power supply in electrical contact with the anode and cathode; and
  b) applying a voltage between the cathode and the anode to electrodeposit a polymer coating onto at least a portion of the substrate that is in contact with the aqueous dispersion.

18. The process of claim 17 further comprising the step of: heating the polymer coating.

19. The process of claim 17 wherein the aqueous dispersion further comprises a crosslinking agent.

20. The process of claim 17 wherein the aqueous dispersion further comprises at least one additive selected from the group consisting of: surfactants, pigments, light stabilizers, anti-crater agents, flow aids, dispersion stabilizers, adhesion promoters, corrosion inhibitors, and fillers.

21. A coated article produced by the process of claim 17.

* * * * *